US008692829B2

(12) United States Patent
Hakura et al.

(10) Patent No.: US 8,692,829 B2
(45) Date of Patent: Apr. 8, 2014

(54) CALCULATION OF PLANE EQUATIONS AFTER DETERMINATION OF Z-BUFFER VISIBILITY

(75) Inventors: Ziyad S. Hakura, Gilroy, CA (US); Emmett M. Kilgariff, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 218 days.

(21) Appl. No.: 12/876,827

(22) Filed: Sep. 7, 2010

(65) Prior Publication Data

US 2011/0080406 A1 Apr. 7, 2011

Related U.S. Application Data

(60) Provisional application No. 61/248,800, filed on Oct. 5, 2009.

(51) Int. Cl.
*G06T 15/40* (2011.01)
*G06T 15/50* (2011.01)
*G06T 15/60* (2006.01)

(52) U.S. Cl.
USPC .......................................... 345/426; 345/422

(58) Field of Classification Search
None
See application file for complete search history.

(56) References Cited

U.S. PATENT DOCUMENTS

| | | | | |
|---|---|---|---|---|
| 5,561,750 A | * | 10/1996 | Lentz | 345/422 |
| 5,751,291 A | * | 5/1998 | Olsen et al. | 345/422 |
| 6,094,200 A | * | 7/2000 | Olsen et al. | 345/422 |
| 6,246,415 B1 | * | 6/2001 | Grossman et al. | 345/422 |
| 6,480,205 B1 | * | 11/2002 | Greene et al. | 345/631 |
| 6,636,215 B1 | * | 10/2003 | Greene | 345/422 |
| 6,646,639 B1 | * | 11/2003 | Greene et al. | 345/422 |
| 6,697,063 B1 | * | 2/2004 | Zhu | 345/421 |
| 6,717,576 B1 | * | 4/2004 | Duluk et al. | 345/419 |
| 7,068,272 B1 | * | 6/2006 | Voorhies et al. | 345/422 |
| 7,366,842 B1 | * | 4/2008 | Acocella et al. | 711/118 |
| 7,382,368 B1 | * | 6/2008 | Molnar et al. | 345/421 |
| 7,447,873 B1 | * | 11/2008 | Nordquist | 712/22 |
| 7,450,120 B1 | * | 11/2008 | Hakura et al. | 345/421 |
| 2002/0126126 A1 | * | 9/2002 | Baldwin | 345/557 |
| 2008/0030513 A1 | * | 2/2008 | Jiao et al. | 345/530 |
| 2008/0094412 A1 | * | 4/2008 | Jiao et al. | 345/621 |
| 2008/0141131 A1 | * | 6/2008 | Cerny et al. | 715/716 |
| 2008/0273033 A1 | * | 11/2008 | Brennan | 345/422 |

* cited by examiner

*Primary Examiner* — David T Welch
*Assistant Examiner* — Jason Pringle-Parker
(74) *Attorney, Agent, or Firm* — Patterson & Sheridan, L.L.P.

(57) ABSTRACT

One embodiment of the present invention sets forth a technique for computing plane equations for primitive shading after non-visible pixels are removed by z culling operations and pixel coverage has been determined. The z plane equations are computed before the plane equations for non-z primitive attributes are computed. The z plane equations are then used to perform screen-space z culling of primitives during and following rasterization. Culling of primitives is also performed based on pixel sample coverage. Consequently, primitives that have visible pixels after z culling operations reach the primitive shading unit. The non-z plane equations are only computed for geometry that is visible after the z culling operations. The primitive shading unit does not need to fetch vertex attributes from memory and does not need to compute non-z plane equations for the culled primitives.

17 Claims, 8 Drawing Sheets

CALCULATION OF PLANE EQUATIONS AFTER DETERMINATION OF Z-BUFFER VISIBILITY

CROSS-REFERENCE TO RELATED APPLICATIONS

This application claims priority benefit to U.S. provisional patent application titled, "Calculation of Plane Equations After Determination of Z-Buffer Visibility Through Z-Cull and Early-Z," filed on Oct. 5, 2009 and having Ser. No. 61/248,800.

BACKGROUND OF THE INVENTION

1. Field of the Invention

The present invention generally relates to graphics processing and more specifically to computing plane equations for primitive shading after non-visible pixels are removed by z culling operations.

2. Description of the Related Art

In conventional graphics processing systems, plane equations for primitives are computed after primitives that are outside of the viewport frustum are culled. The plane equations are computed before z culling operations that determine visibility of primitives based on z-buffering. Consequently, plane equations may be computed for primitives that are culled during z culling operations and do not contribute to the final image. However, delaying computation of the plane equations until the z culling operations are complete delays primitive shading that relies on the plane equations and necessitates buffering of the vertex data that is used to compute the plane equations.

Accordingly, what is needed in the art is a technique for computing plane equations for primitive shading after non-visible pixels are removed by z culling operations.

SUMMARY OF THE INVENTION

A system and method of computing plane equations for primitive shading after non-visible pixels are removed by z culling operations. Z culling (or depth culling) operations typically culls objects that are behind (in depth or z) the closest object to the eyepoint at a particular pixel. The z plane equations are computed before the plane equations for non-z primitive attributes that are needed as input to the pixel sander, such as texture coordinates, vertex color attributes, and the like, are computed. The z plane equations are then used to perform screen-space z culling of primitives following coarse-level rasterization and again following fine-level rasterization. Culling of primitives is also performed based on pixel sample coverage following fine-level rasterization. Consequently, primitives that have visible pixels after both z cull and early-z z-buffer cull operations reach the primitive shading unit. The non-z plane equations are only computed for geometry that is visible after the z cull and early-z z-buffer cull operations. The primitive shading unit does not need to fetch vertex attributes from memory and does not need to compute non-z plane equations for the culled primitives. Processing performance may be improved and the memory bandwidth may be reduced since fewer vertex attributes are read. Power consumption may also be reduced since the culled primitives are not shaded and the vertex attributes are not read from memory.

Various embodiments of a method of the invention for computing plane equations for graphic primitives include computing a z plane equation for each one of the graphics primitives using z attributes of each vertex of a graphics primitive and rasterizing each one of the graphics primitives at a coarse level to produce coarse z values by evaluating the z plane equations. One or more of the rasterized graphics primitives is culled based on the coarse z values to produce remaining graphics primitives. After producing the remaining graphics primitives, a non-z plane equation is computed for each one of the remaining graphics primitives using a different attribute of each vertex of the graphics primitive and the remaining graphics primitives are shaded by evaluating the non-z plane equations to produce an image.

Various embodiments of the invention include a system for computing plane equations for graphic primitives. The system includes a rasterizer, a primitive engine, and a setup unit that is configured to compute a z plane equation for each one of the graphics primitives using z attributes of each vertex of a graphics primitive. The rasterizer is configured to rasterize each one of the graphics primitives at a coarse level to produce coarse z values by evaluating the z plane equations and cull one or more of the rasterized graphics primitives based on the coarse z values to produce remaining graphics primitives. The primitive engine is configured to receive the remaining graphics primitives, and compute a non-z plane equation for each one of the remaining graphics primitives using a different attribute of each vertex of the graphics primitive. The primitive engine then shades the remaining graphics primitives by evaluating the non-z plane equations to produce an image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
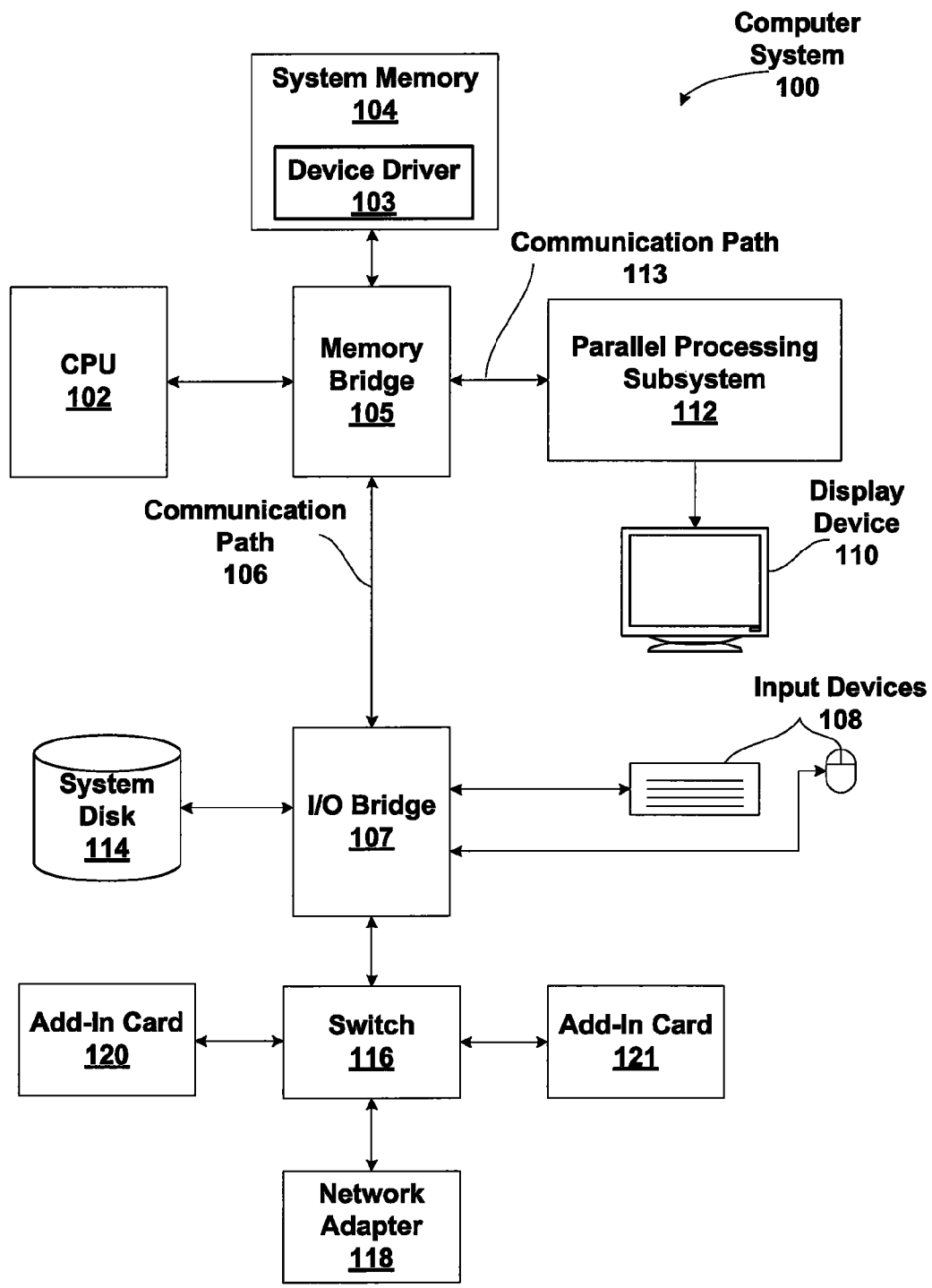
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
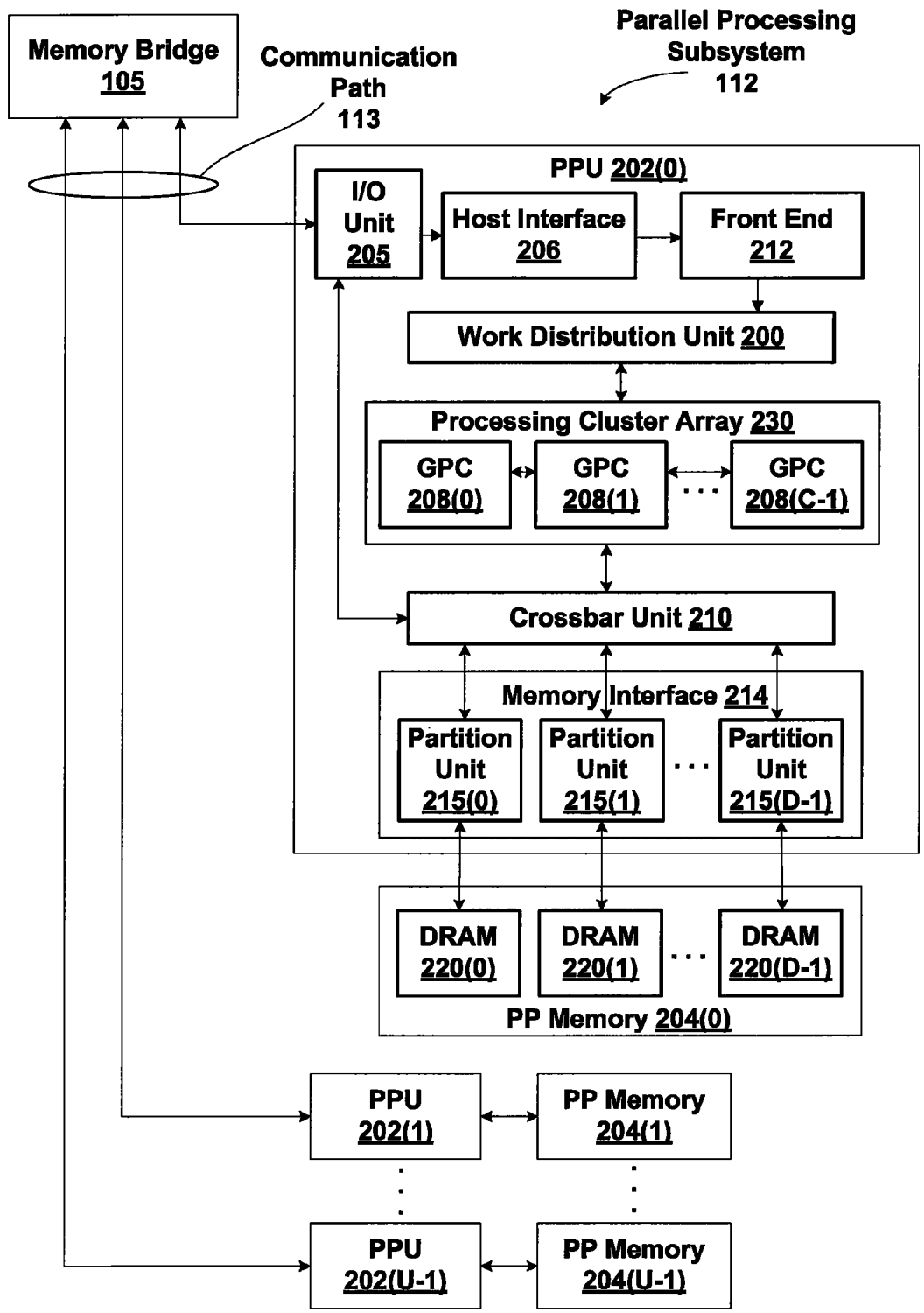
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
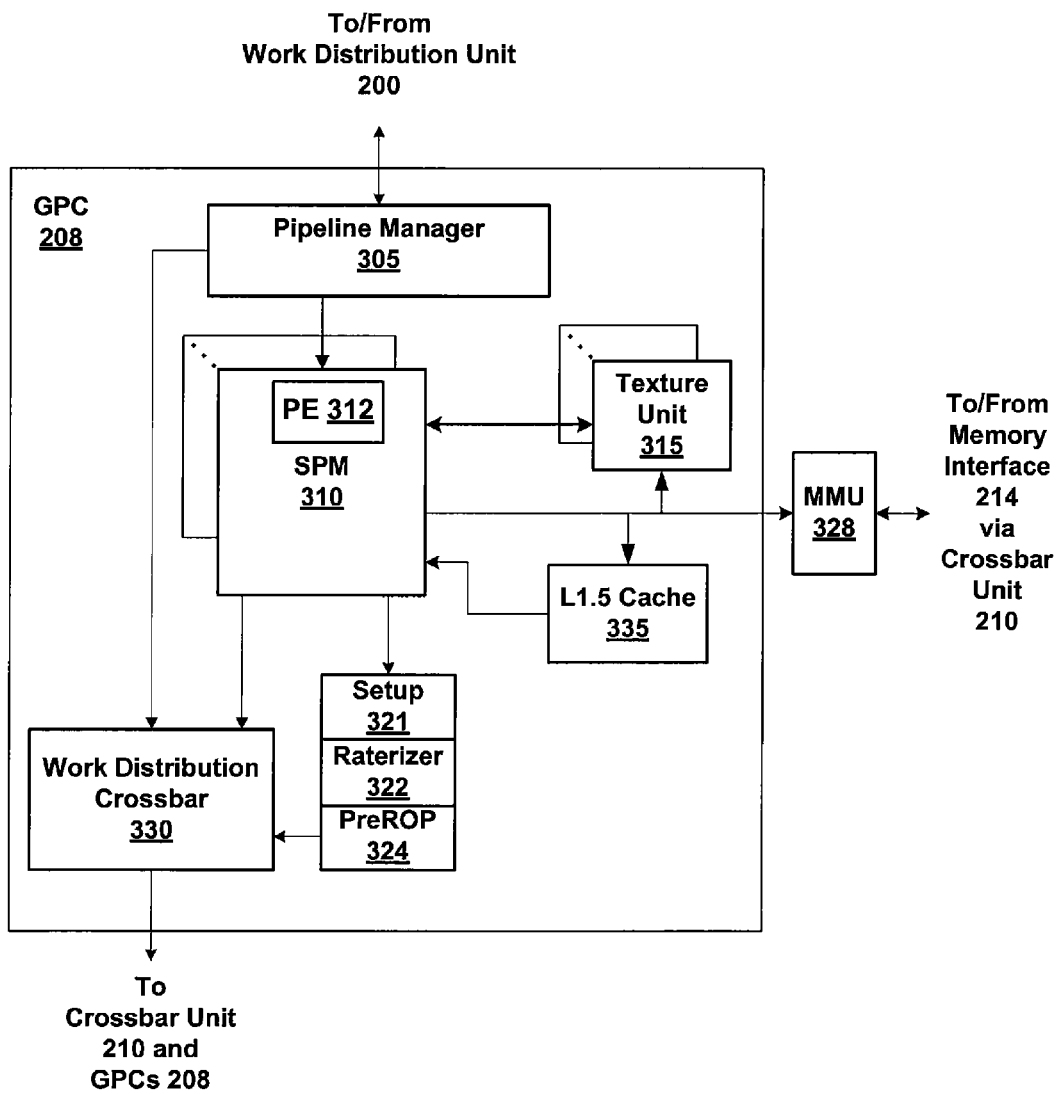
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. Each SPM 310 also includes a primitive engine (PE) 314 that is configured to interpolate primitive attributes prior to pixel shading.

Each GPC 208 is responsible for processing a portion of the screen-space. It is desirable to distribute rasterization in screen-space portions of an image so that shading, texturing, and frame buffer accesses have locality and rasterization of the primitives in each portion may be performed in parallel and independently. The image, called the render target, is subdivided into small "screen tiles," and the screen tiles are partitioned into non-overlapping sets that cover the image. A different GPC 208 is assigned to each screen tile set. In one embodiment, each screen tile set includes statically mapped 16×16-pixel regions. The GPC 208 may be configured to perform setup and rasterization for up to one triangle per clock. A given GPC 208 is configured to rasterize each primitive that touches at least one pixel within the portion of the screen-space assigned to the given GPC 208. Large primitives may be rasterized by every GPC 208 while a small primitive may only be rasterized by one GPC 208.

A setup unit 321 is configured to receive data from SPM 310 and compute the edge and plane equations for the z attribute using the per-vertex attributes of each primitive. The setup 321 forwards the edge and z (depth) plane equations for object-space processed primitives to the rasterizer 322. In one embodiment, the setup 321 stores partial plane equations for vertex non-z attributes in a buffer for subsequent retrieval by the fragment shader so that the fragment shader (PE 314) does not need to compute a complete plane equation for each of the non-z attributes after z culling operations are performed by the rasterizer 322 and preROP 324.

The rasterizer 322 associated with each setup 321 iterates within the primitive bounding box, guided by the edge equations, to identify tiles with sample coverage. The rasterizer 322 contains a coarse stage, which identifies large tiles that could contain sample coverage and a fine stage, which tests sample locations against edge equations. In one embodiment, the rasterizer 322 uses knowledge of the GPC screen tile mapping to skip over tiles assigned for processing by other GPCs 208. In some embodiments, a hierarchical Z unit which can rapidly reject tiles that are known to lie behind occluding geometry is included between the two rasterizer stages to perform z culling based on early z z-buffer operations. More specifically, the hierarchical Z unit keeps track of the closest occluding object for a given tile at a coarse screen granularity, such as the four corners of the tile.

While the fine stage of the rasterizer 322 does not perform any depth culling, the fine stage can still cull primitives based on coverage information, e.g., primitives that do not overlap with any pixel sample locations because the primitives are small and fall between sample locations. These small primitives do not generate any pixels when rasterized and, are therefore not shaded, so the non-z plane equations are not needed. Following the fine stage of the rasterizer 322, early z-buffer culling may be performed that uses the full precision of the z-buffer in memory. A preROP (pre-raster operations) 324 directs data to ROP units within partition units 215, perform, optimizations for color blending, organizes pixel color data, and performs address translations. The preROP 324 configures the ROP units to perform the early z-buffer culling.

It will be appreciated that the core architecture described herein is illustrative and that variations and modifications are possible. Any number of processing units, e.g., SPMs 310 or texture units 315, setup units 321, rasterizers 322, preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
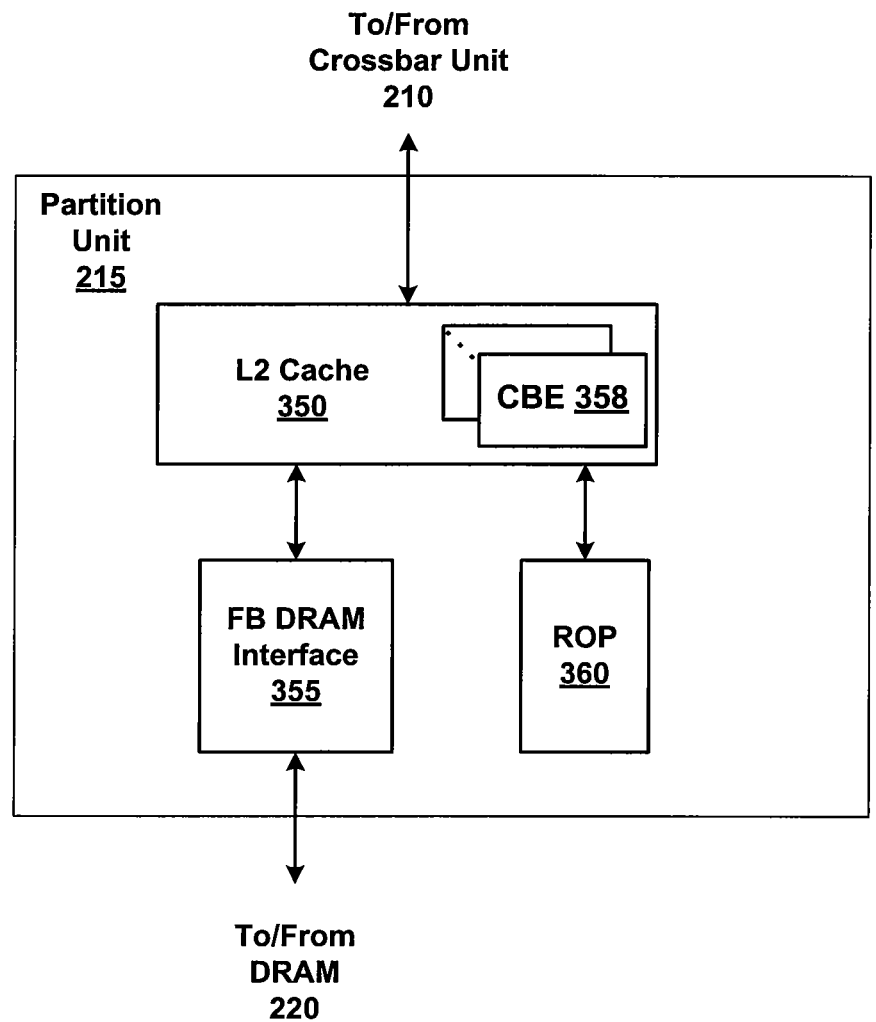
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

The L2 cache 350 may store entries of circular buffers, circular buffer entries (CBE) 358 that are configured to store primitive attribute data, constants and state information, and the like. A CB manager allocates the CBE 358 to reside in the system shared L2 cache 350, although the L2 cache 350 may flush the CBE 358 to backing store if necessary. Normally CBEs 358 are assigned a high stickiness value in the L2 cache 350. More specifically, CBEs 358 are typically marked "evict last," which means CBE 358 will not be evicted from the cache until there is no lower priority data available for eviction. This treatment is useful because the First-In-Random-Out (FIRO) discipline of circular buffer accesses does not work well with the least-recently-used eviction policy used by the L2 cache 350. However, the stickiness value is programmable. In some embodiments, the circular buffers configured to store primitive attribute data may be given a lower, "evict normal" priority, because the primitive attribute reader is able to tolerate more latency compared with processing units reading other data from the L2 cache 350. The PE 314 issues requests to the CB manager when a CBE is needed to store primitive attribute data for a batch of primitives received from the primitive distribution unit 200.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
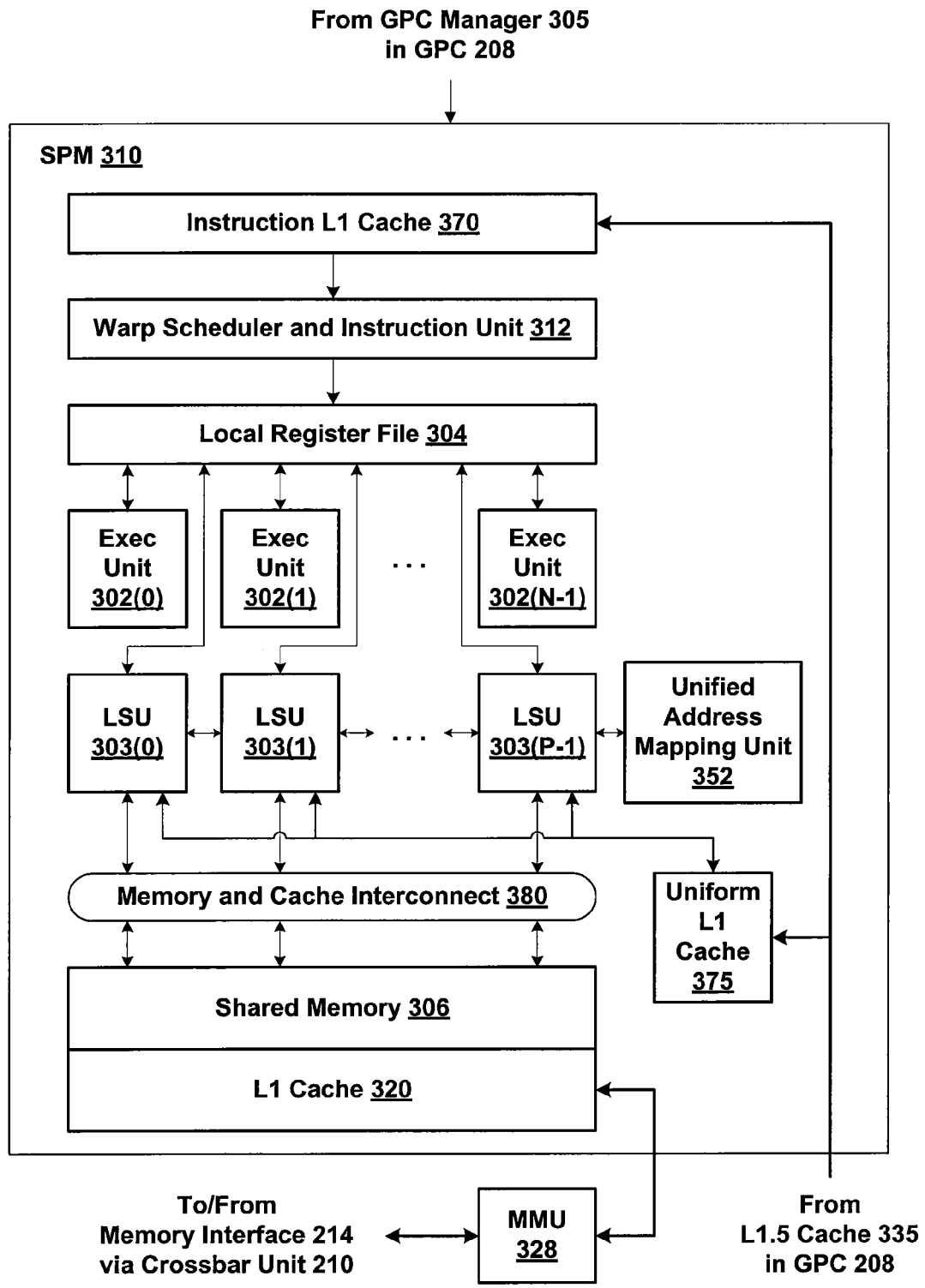
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
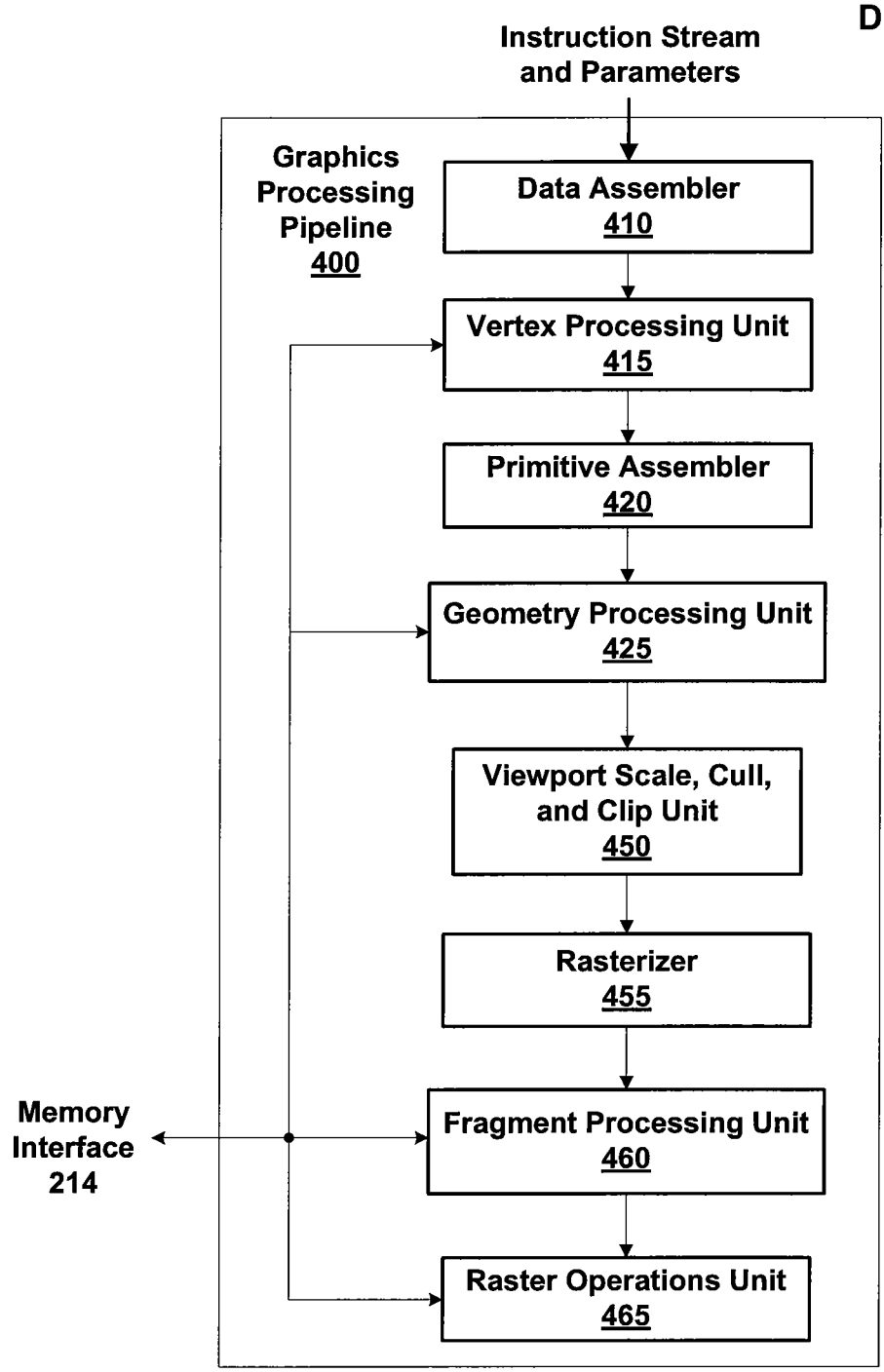
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling of primitives that lie outsize of the viewport frustum, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

The bulk of the data transferred (via indices) between geometry processing and rasterization is vertex attributes. The attributes are the parameters calculated for each vertex, such as x, y, z position, texture coordinates, vertex colors, and other shader parameters. Some parameters, such as x,y, z (position) are needed by the rasterizer to determine primitive coverage and depth values. Other attributes are needed, as interpolated values, by the fragment shader. The number and type of attributes depends on the vertex and fragment shaders.

Vertex attributes need to be buffered from the time they are calculated by the SPMs 310 doing object-space processing until they are needed by the primitive setup unit 321 that computes the z attribute plane equations or the fragment processing unit 460 that computes non-z attribute plane equations and shades the primitives using the plane equations. The amount of data that needs to be buffered is highly variable, depending on the number and type of attributes per vertex. The amount of data may be near zero for full-screen primitives and the amount of data may be extremely high in high primitive rate cases. The amount of data may also be highly variable per GPC 208 when a large number of small primitives fall onto a single screen tile.

Because of these potentially large and highly variable buffering requirements, it may be advantageous to store vertex attributes in the L2 cache 350. The L2 cache 350 is a large, pooled resource that is used for many purposes: caching textures, caching rendered pixels, and caching primitive attributes. In high triangle rate cases a greater amount of attribute buffering is needed, so the bulk of the L2 cache 350 may be used to cache (primitive and vertex) attribute data instead of texture data. When requirements for attribute buffering are low, the L2 cache 350 may be used primarily for caching texture data.

Each SPM 310 performing object-space processing is provided with a fixed size linear buffer that is virtually addressed and cacheable. The addresses used to access these linear buffers wrap, so the linear buffers are actually circular FIFO (first-in, first-out) buffers. As SPMs 310 stream vertex attributes into the circular buffers, the SPMs 310 provide indices for entries written to the work distribution crossbar interface 330, which are conveyed to the GPCs 208 performing the screen-space processing. GPCs 208 that need to read circular buffer entries (CBEs) do so at two points: primitive setup and fragment shader interpolation. Entries that are unneeded by a GPC 208 are skipped—not read by the GPC 208, while other entries may be read by multiple GPCs 208.

Because virtual addressing is used for the circular buffers, the full circular buffer may always be allocated, but only cache lines storing valid data need be resident in the L2 cache 350. As previously described, when CBEs 358 are written to the L2 cache 350, the cache line may be marked with "no-evict" status, so the cache line storing attribute data will not be flushed from the L2 cache 350. A CB manager also has the task of freeing CBEs 358 when the GPCs 208 are finished with them. To achieve this, the rasterizers 322 track the CBEs 358 through the screen-space processing and signal the CB manager when a CBE 358 may be invalidated. The work distribution crossbar interface 330 keeps a reference count per CBE 358 of how many screen-space pipelines (where a screen-space pipeline includes the setup 321, rasterizer 322, PreROP 324, and SPMs 310) are using the CBE 358. When this reference count for a particular CBE 358 goes to zero, the work distribution crossbar interface 330 may signal the CB manager 318 to invalidate that CBE 358.

Plane Equation Calculation After Z Culling Operations

In order to avoid reading CBEs 328 to compute the plane equations needed to shade attributes of non-visible primitives, it is advantageous to defer the computation of the non-z plane equations until after z culling operations have been performed. Therefore, the setup unit 321 computes the z plane equations and computation of the plane equations for the other attributes (non-z attributes) is deferred until after the rasterizer performs z culling (based on coarse rasterization) and determines the pixel coverage (based on fine rasterization). Computation of the plane equations for the other attributes (non-z attributes) is also deferred until after the preROP 324 performs early z z-buffer operations to determine which screen-space tiles have visible pixels. For tiles for which no primitives are visible, the PE 314 does not need to fetch vertex attributes from memory, and do not need to compute plane equations. In cases where some primitives are visible and other primitives are culled by the rasterizer 322 and preROP 324, the PE 314 only fetches vertex attributes and a plane equation evaluation unit within the PE 314 operates in screen space and computes plane equations for the visible primitives. Performance is improved since only visible primitives are shaded and power consumption may be reduced since the vertex attributes are not read from memory.

Figure 5:
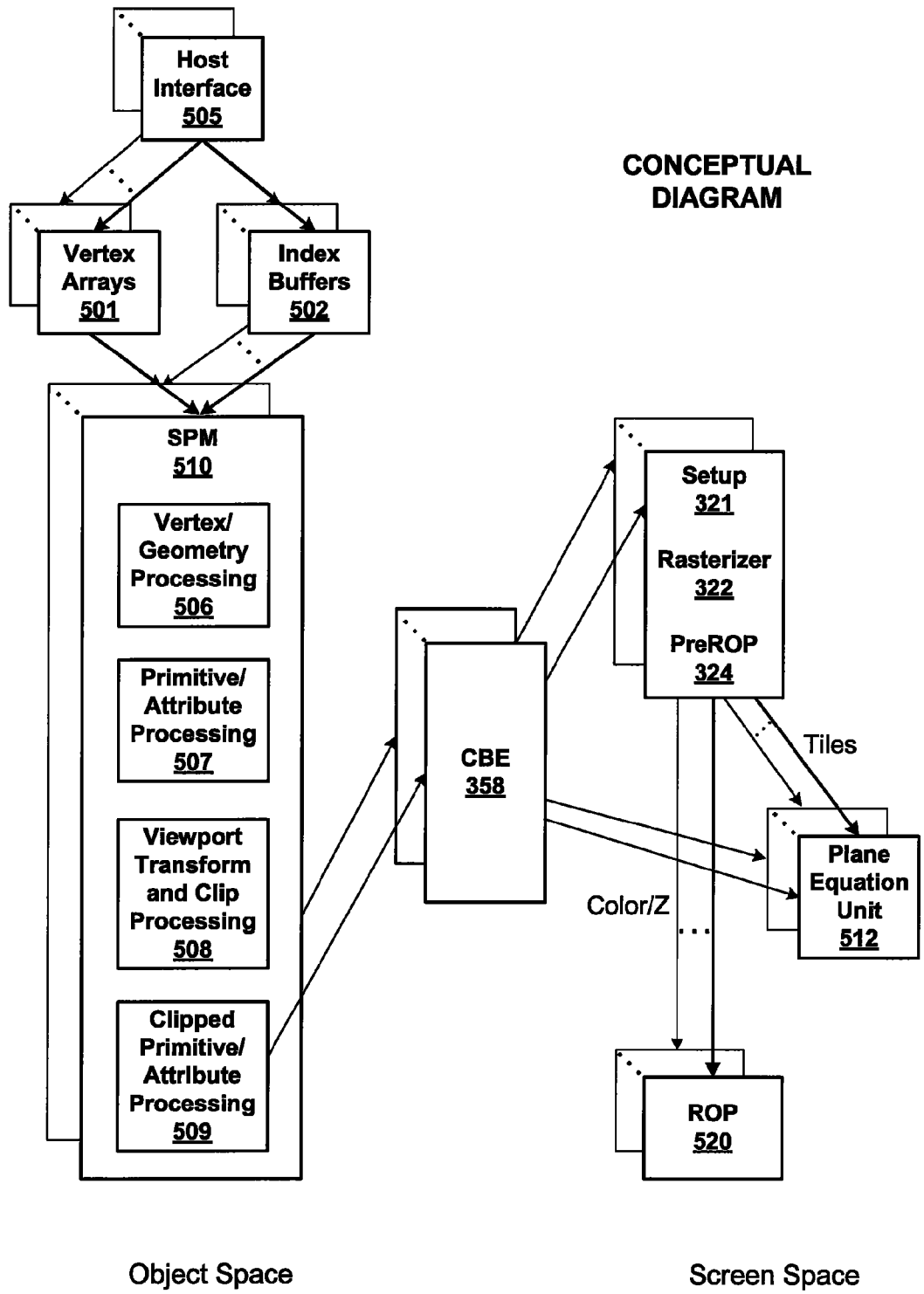
FIG. 5 is a conceptual diagram of the graphics processing, according to one embodiment of the present invention.

FIG. 5 is a conceptual diagram of the graphics processing, according to one embodiment of the present invention. A host interface 505 reads a pushbuffer to obtain processing work. The work is then divided into batches for processing by the GPCs 208. The index buffers 502 are pointers to primitive index lists stored in memory. The entries in these index lists point into lists of vertex attributes, also stored in memory as vertex arrays 501. The batches are distributed to SPMs 510 for object space processing. Within each SPM 510 various processing operations are performed, such as, vertex/geometry processing 506, primitive/attribute processing 507, viewport transform and clip processing 508, and clipped primitive/attribute processing 509. The functions of primitive/attribute processing 507, viewport transform and clip processing 508, and clipped primitive/attribute processing 509 may be performed by the viewport scale, cull, and clip unit 450 shown in FIG. 4. The clipped primitive/attribute processing 509 operation writes the primitive attributes to the CBEs 358.

The work distribution crossbar interface 330 and the work distribution crossbar fabric 334 (not shown) provide a connection between the object-space processing and the screen-space processing. Specifically, the work distribution crossbar interface 330 and the work distribution crossbar fabric 334 distribute the multiple primitive streams (primitive descriptors, CBE addresses, and tags) to the multiple screen-space processing element groups that including, setup 321, rasterizer 322, preROP 324, plane equation unit 514, and the ROP 520. As previously explained, each one of the screen-space processing element groups is responsible for a portion of the screen pixels.

The primitive attribute data in the CBEs 358 that is needed to compute the z plane equations are read by the setup 321. After z culling and early z z-testing is completed by the rasterizer 322 and preROP 324, the plane equation unit 514 computes the non-z plane equations for the visible primitives using primitive attribute data in the CBEs 358. The preROP 324 outputs tiles to pixel shaders executing in the GPC 208 and color and z (depth) data to ROP 520. The plane equation unit 514 reads the primitive attribute data from the CBEs 358 to compute the non-z attribute plane equations. When the plane equation unit 514 has completed reading a particular CBE 358 during execution of a pixel shader, that CBE may be released and invalidated by the CB manager 318. If none of the primitives associated with the primitive attribute data in the particular CBE 358 are visible following the z culling and early z z-testing operations, that CBE is released and invalidated without being read by the plane equation unit 514.

The primitive attributes are read from the CBE 358 by the setup 321 (reads the XYZ position attributes) and the PE 312 (not shown) for pixel shading (primitive attribute interpolation). When a primitive flows through the rasterizer 322, the primitive may cover multiple screen tiles. These screen tiles are the basic processing unit the preROPs 324 operate on. A tile coalescer unit within each rasterizer 322 keeps a tile count for any CBEs 358 that are referred to by a screen tile and receives information with the preROP 324 in order to determine when each CBE is no longer needed so that the CBE can be released and invalidated.

The plane equation unit 514 may be configured to compute the plane equations for each non-z attribute and evaluate the computed plane equations to determine each attribute value at a sample. In one embodiment the plane equation unit 514 is configured to compute plane equations for just 1/w, two perspectively corrected barycentric coordinates, and possible two non-perspective corrected (screen-linear) barycentric cords. The values of the non-z attributes are then computed by the SPM 510 at a pixel sample using these plane equations and the values of the non-z attributes at the vertices.

Figure 6:
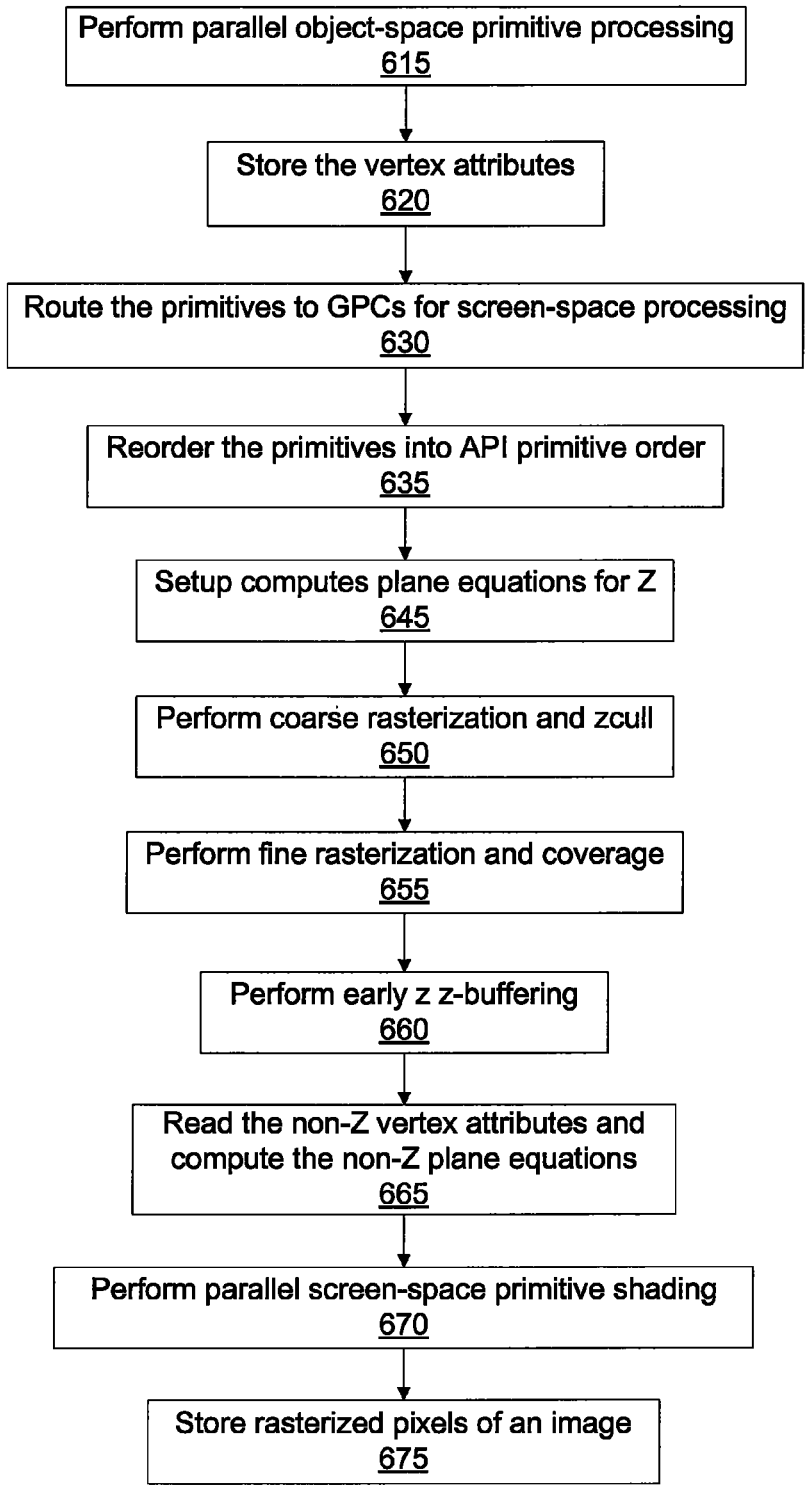
FIG. 6 is a flow diagram of method steps for calculating the non-Z plane equations after z culling and early z-buffer operations, according to one embodiment of the present invention.

FIG. 6 is a flow diagram of method steps for calculating the non-Z attribute plane equations after z culling and early z-buffer operations, according to one embodiment of the present invention. At step 615 the SPMs 310 perform object-space processing on the primitives to produce streams of object-space processed primitives. The time to process one vertex is independent of how large the primitive appears on the screen. By distributing geometry processing in vertex batches, the processing load is distributed across the GPCs 208.

At step 620 the SPMs 310 write the vertex attributes that are produced by the object-space processing of the primitives into a circular buffer of the L2 cache 350. At step 630 each primitive is routed by the work distribution crossbar interface 330 through the work distribution crossbar fabric 334 to the GPC(s) for screen-space processing. At step 635 the primitives are reordered in the GPC 208 to match the API primitive order in which the primitives were received by the work distribution unit 200. At step 645 the vertex attributes needed for computing the z plane equations for the primitives are read by the setup 321 and the setup units 321 convert the vertex attributes into plane equations describing polygon edges and depth values to be interpolated.

Setup 321 also computes the primitive bounding box and initialization parameters for the rasterizer 322, and performs various culling operations such as back-face and zero-area culling. Setup 321 receives primitive descriptors in API primitive order from the work distribution crossbar interface 330. Each primitive descriptor is associated with an attribute buffer address, i.e., a pointer to the processed vertex attribute data stored in circular buffers in the L2 cache 350. Setup 321 requests x, y, z position attributes, which are common for all primitives a given type, regardless of the number of additional vertex attributes. When these are returned from the L2 cache 350 via the crossbar 330, setup 321 computes edge equations and z attribute plane equations for the primitive.

At step 650 the rasterizer 322 iterates within the primitive bounding box, guided by the edge equations, to identify screen tiles with sample coverage. Rasterizer 322 performs coarse rasterization of the primitive pixels that lie within the screen-space tile(s) for which the GPC 208 is responsible. The rasterizer 322 advantageously skips over screen tiles that are assigned to other rasterizers 322. In some embodiments the rasterizer 322 is configured to skip over screen tiles in zero time. At step 650 the hierarchical Z unit rapidly reject tiles that are known to lie behind occluding geometry to perform z culling. At step 655 the rasterizer 322 performs fine rasterization to determine the sample coverage for the primitive pixels that lie within the screen-space tile(s) for which the GPC 208 is responsible. When no samples within a screen tile are covered, the primitive may be culled for the screen-space tile and tile-specific non-z attribute plane equations will not be computed for the primitive. Note, that the non-z attribute plane equations may be computed specific for each screen-space tile rather than for the entire screen.

At step 660 the preROP 324 performs an early z z-buffer test to determine whether or not each primitive that lies within the screen-space tile(s) for which a PTC 208 is responsible for are obscured. Each primitive that is obscured is culled and the PE 314 will not compute tile-specific non-z attribute plane equations for the primitive. At step 665 the PEs 314 receive the primitives that have survived the z culling operations (z culling, coverage, and early z z-buffering) and compute the tile-specific non-z attribute plane equations for the surviving primitives.

At step 670 the SPMs 310 perform parallel screen-space primitive shading using the tile-specific non-z attribute plane equations. Each SPM 310 stores its results in color (and optionally z) output registers. Output logic pulls final colors from the output registers and sends them to ROPs 360 associated with the frame-buffer partitions over the crossbar unit 210. At step 675 the rasterized pixels of an image are output and stored.

In sum, if screen tiles constructed in the rasterizer 322 are empty (primitives have been culled) by the time they reach the PEs 314 then the non-z plane equations are not computed. Screen tiles may be empty as a result of culling performed during coarse and fine rasterization and early z z-buffering. The non-z plane equations are only computed for geometry that is visible after the z cull, coverage determination, and early z z-buffer cull operations. The PEs 314 configured to perform primitive shading do not need to fetch vertex attributes from memory and do not need to compute non-z plane equations for the culled primitives. Processing performance may be improved and the memory bandwidth may be reduced since fewer vertex attributes are read. Power consumption may also be reduced since the culled primitives are not shaded and the vertex attributes are not read from memory.

Although the method steps are described in conjunction with the systems of FIGS. 1, 2, 3A, 3B, 3C, and 5, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for computing plane equations for graphic primitives, comprising:
   for each graphics primitive in the graphics primitives, storing vertex attributes in a circular buffer entry associated with the graphics primitive;
   computing a z plane equation for each one of the graphics primitives using z attributes of each vertex of a graphics primitive, wherein each z attribute is stored in a circular buffer entry;
   for each graphics primitive in the graphics primitives, storing a partial plane equation for vertex non-z attributes in a buffer for subsequent retrieval by a fragment shader;
   rasterizing each one of the graphics primitives at a coarse level to produce coarse z values by evaluating the z plane equations;
   culling one or more of the rasterized graphics primitives based on the coarse z values to produce remaining graphics primitives;
   for each graphics primitive that is culled, invalidating the corresponding circular buffer entry;
   dividing a screen-space into a plurality of screen-space tiles;
   computing, after producing the remaining graphics primitives, a non-z plane equation for each one of the remaining graphics primitives and only for each screen-space tile included within a subset of the plurality of screen-space tiles, wherein the non-z plane equations are calculated using a different attribute for each vertex of the graphics primitive stored in a circular buffer entry; and
   shading the remaining graphics primitives by evaluating the non-z plane equations to produce an image,
   wherein culling the one or more rasterized graphics primitives, and invalidating the circular buffer entries, cause invalidated circular buffer entries to not be accessed during computing.

2. The method of claim 1, wherein the culling further comprises:
   computing fine z values; and
   culling one or more of the rasterized graphics primitives based on the fine z values to produce the remaining graphics primitives.

3. The method of claim 1, wherein the culling further comprises:
   rasterizing each one of the graphics primitives to produce sample coverage information by evaluating edge equations; and
   culling one or more of the rasterized graphics primitives based on the sample coverage information.

4. The method of claim 1, further comprising storing the circular buffer entry in a level-two cache.

5. The method of claim 1, wherein the computing of the z plane equation for each one of the graphics primitives comprises computing a separate z plane equation for each screen space tile that is intersected by each one of the graphics primitives.

6. The method of claim 1, wherein the computing of the non-z plane equation for each one of the remaining graphics primitives comprises computing a separate non-z plane equation for each screen space tile that is intersected by each one of the remaining graphics primitives.

7. The method of claim 1, wherein the steps of computing the z plane equations and computing the non-z plane equations are executed for the subset of screen-space tiles by a screen-space processing element group associated with the subset of screen-space tiles.

8. A non-transitory computer-readable storage medium storing instructions that, when executed by a processor, compute plane equations for graphic primitives, by performing the steps of:

for each graphics primitive in the graphics primitives, storing vertex attributes in a circular buffer entry associated with the graphics primitive;

computing a z plane equation for each one of the graphics primitives using z attributes of each vertex of a graphics primitive, wherein each z attribute is stored in a circular buffer entry;

for each graphics primitive in the graphics primitives, storing a partial plane equation for vertex non-z attributes in a buffer for subsequent retrieval by a fragment shader;

rasterizing each one of the graphics primitives at a coarse level to produce coarse z values by evaluating the z plane equations;

culling one or more of the rasterized graphics primitives based on the coarse z values to produce remaining graphics primitives;

for each graphics primitive that is culled, invalidating the corresponding circular buffer entry;

dividing a screen-space into a plurality of screen-space tiles;

computing, after producing the remaining graphics primitives, a non-z plane equation for each one of the remaining graphics primitives and only for each screen-space tile included within a subset of the plurality of screen-space tiles, wherein the non-z plane equations are calculated using a different attribute for each vertex of the graphics primitive stored in a circular buffer entry; and shading the remaining graphics primitives by evaluating the non-z plane equations to produce an image, wherein culling the one or more rasterized graphics primitives, and invalidating the circular buffer entries, cause invalidated circular buffer entries to not be accessed during computing.

9. The non-transitory computer-readable medium of claim 8, wherein the culling further comprises:

computing fine z values; and culling one or more of the rasterized graphics primitives based on the fine z values to produce the remaining graphics primitives.

10. The non-transitory computer-readable medium of claim 8, wherein the culling further comprises:

rasterizing each one of the graphics primitives to produce sample coverage information by evaluating edge equations; and culling one or more of the rasterized graphics primitives based on the sample coverage information.

11. The non-transitory computer-readable medium of claim 8, wherein the computing of the z plane equation for each one of the graphics primitives comprises computing a separate z plane equation for each screen space tile that is intersected by each one of the graphics primitives.

12. A system for computing plane equations for graphic primitives, the system comprising:

a circular buffer configured to store vertex attributes in a circular buffer entry associated with each graphics primitive in the graphics primitives;

a setup unit configured to compute a z plane equation for each one of the graphics primitives using z attributes of each vertex of a graphics primitive, wherein each z attribute is stored in a circular buffer entry, and for each graphics primitive in the graphics primitives, store a partial plane equation for vertex non-z attributes in a buffer for subsequent retrieval by a fragment shader;

a rasterizer that is coupled to the setup unit and configured to:

rasterize each one of the graphics primitives at a coarse level to produce coarse z values by evaluating the z plane equations; and cull one or more of the rasterized graphics primitives based on the coarse z values to produce remaining graphics primitives;

for each graphics primitive that is culled, invalidate the corresponding circular buffer entry;

a primitive engine that is configured to:

divide a screen-space into a plurality of screen-space tiles;

receive the remaining graphics primitives, and compute a non-z plane equation for each one of the remaining graphics primitives and only for each screen-space tile included within a subset of the plurality of screen-space tiles, wherein the non-z plane equations are calculated using a different attribute for each vertex of the graphics primitive stored in a circular buffer entry; and shade the remaining graphics primitives by evaluating the non-z plane equations to produce an image, wherein culling the one or more rasterized graphics primitives, and invalidating the circular buffer entries, cause invalidated circular buffer entries to not be accessed by the during computing.

13. The system of claim 12, wherein the rasterizer is further configured to:

compute fine z values; and cull one or more of the rasterized graphics primitives based on the fine z values to produce the remaining graphics primitives.

14. The system of claim 12, wherein the rasterizer is further configured to:

rasterize each one of the graphics primitives to produce sample coverage information by evaluating edge equations; and cull one or more of the rasterized graphics primitives based on the sample coverage information.

15. The system of claim 12, further comprising storing the circular buffer entry in a level-two cache.

16. The system of claim 12, wherein the setup unit is further configured to compute a separate z plane equation for each screen space tile that is intersected by each one of the graphics primitives.

17. The system of claim 12, wherein the primitive engine is further configured to compute a separate non-z plane equation for each screen space tile that is intersected by each one of the remaining graphics primitives.

* * * * *